Patented Mar. 7, 1939

2,149,671

UNITED STATES PATENT OFFICE 2,149,671

PROCESS FOR PURIFYING CARBON BLACK WHICH HAS BEEN FORMED ON IRON-CONTAINING CONTACTS

Hans Heinrich Franck, Berlin-Charlottenburg, and Diederich Wilm, Berlin-Friedenau, Germany No Drawing. Application February 26, 1936, Serial No. 65,934. In Germany February 28, 1935

9 Claims. (Cl. 134—60)

The carbon black formed by the decomposition of carbon monoxide or other gases containing combined carbon on metals of the iron group according to various known methods is always contaminated with the contact substances in extremely finely divided state, above all in the form of carbide in quantities of up to 6%.

It is known that this carbon black can be purified by boiling with dilute acids, e. g. nitric acid or hydrochloric acid. Apart from the inconvenience and tediousness of this purification process, however, a perfectly pure product is by no means obtained particularly in the case of carbon black deposited on iron contacts or contacts which contain iron in the form of iron carbide, so that up to now universal use of this soot-like carbon has not been possible.

It has now been found that a complete, or almost complete, removal can be effected of the iron carbide if the carbon block containing iron carbide is treated with chlorine or gases containing the same at temperatures lying above 400° C. but below 1250° C. The chlorine may be either moist or dry. It may also be diluted with nitrogen or some other indifferent gas and when using moist gases the water vapour may be supplied with these latter, separate from chlorine. As far as possible the process is conducted so that the carbon black is uniformly penetrated by the chlorine.

For carrying out the purification either an exteriorly heated rotary tube furnace may be used or a furnace after the style of a crucible furnace. In order completely to drive off the chlorides formed it is necessary to increase the temperature, in certain cases with intermittent or complete shutting off of the stream of chlorine. The interaction products, i. e. for the most part metal chlorides, may also be removed in a stream of indifferent gas, e. g. in a stream of nitrogen, or in a vacuum.

A more advantageous procedure, however, is to spray, sprinkle or scatter the carbon black containing iron carbide which is to be purified through a uniformly highly heated chlorine stream moving in countercurrent to the falling carbon, and for the purpose of removing chlorides which are still unvolatilized, but especially adhering chlorine residues, to effect a spraying or sprinkling through a gas atmosphere which is indifferent towards carbon (e. g. hydrogen, nitrogen, or mixtures of both), if necessary with addition of steam.

The process may also be carried out so that the chlorine not interacting in the purification process is caused to react anew again in a cycle, whence the chlorine losses are diminished to a minimum.

The chlorides of the contaminating metals (for the most part ferric chloride in the case of carbon having an iron content) are obtained as valuable by-product; they can be deposited anhydrous in a suitable manner from the gases or vapours being withdrawn or the metals can be obtained from them in pure form.

The carbon black purified with chlorine contains only traces of impurities, so that according to the nature of the removal method it is possible to use it in the printing ink, lacquer or rubber industries.

Instead of chlorine, or together with it, hydrogen chloride may also be used.

*Example 1.*—A carbon black produced on an iron contact at 470° C. and having an iron content of 3.0% in the form of iron carbide, was treated for two hours at 700° C. with moist chlorine containing nitrogen in an electrically heated rotary tube furnace. In the course of a further two hours the temperature was slowly raised to 1100° C. and the chlorine stream shut off periodically at first and then completely. The carbon black, cooled down in the stream of nitrogen, gave on combustion an ash value of 0.1%, and after a preceding extraction with dilute hydrochloric acid an ash value of only 0.06%; the colour and quality of the carbon black was not adversely influenced by the purification.

*Example 2.*—A carbon black made as in Example 1 with an iron content of 2.5% in the form of iron carbide was sprayed or sprinkled through an upright pipe, 1.5 m. long and 20 mm. wide, heated to 1200° C. in counter-current to chlorine introduced from below. Chloride vapours and unreacted chlorine were led away at the top of the reaction pipe. After a similar spraying or sprinkling through a gas atmosphere consisting of nitrogen and hydrogen the carbon black so treated contained only 0.1–0.2% of iron and scarcely any detectable chlorine residues.

The time the carbon black particles were in the chlorine atmosphere amounted to less than 5 seconds.

What we claim is:

1. A method of purifying carbon black containing carbide of iron group metal which has been formed on iron-containing contacts consisting in treating the carbon black at temperatures exceeding 400° C. with at least one of the substances chlorine gas and hydrogen chloride gas.

2. A method of purifying carbon black containing carbide of iron group metal which has been formed on iron-containing contacts consisting in treating the carbon black in the unsuspended state at temperatures exceeding 400° C. with at least one of the substances chlorine gas and hydrogen chloride gas.

3. A method of purifying carbon black containing carbide of iron group metal which has been formed on iron-containing contacts consisting in treating the carbon black in the unsuspended state at temperatures exceeding 400° C. with at least one of the substances chlorine gas and hydrogen chloride gas, the temperature being increased towards the end of the process for the purpose of expelling metal chlorides formed in the carbon black.

4. A method of purifying carbon black containing carbide of iron group metal which has been formed on iron-containing contacts consisting in treating the carbon black in the unsuspended state at temperatures exceeding 400° C. with at least one of the substances chlorine gas and hydrogen chloride gas, passing a stream of indifferent gas over the carbon black, and increasing the treatment temperature during the passage of said indifferent gas for the purpose of expelling metal chlorides formed in the carbon.

5. A method of purifying carbon black containing carbide of iron group metal which has been formed on iron-containing contacts consisting in treating the carbon black in suspension at temperatures exceeding 400° C. with at least one of the substances chlorine gas and hydrogen chloride gas.

6. A method of purifying carbon black containing carbide of iron group metal which has been formed on iron-containing contacts consisting in treating the carbon black at temperatures exceeding 400° C. with a gas comprising water vapor and at least one of the substances chlorine gas and hydrogen chloride gas.

7. A method of purifying carbon black containing carbide of iron group metal which has been formed on iron-containing contacts consisting in treating the carbon black in the unsuspended state at temperatures exceeding 400° C. with a gas comprising water vapor and at least one of the substances chlorine gas and hydrogen chloride gas.

8. A method of purifying carbon black containing carbide of iron group metal which has been formed on iron-containing contacts consisting in treating the carbon black at temperatures exceeding 400° C. with a gas comprising at least one of the substances chlorine gas and hydrogen chloride gas, removing the metal chlorides formed in the gas, and resupplying the gas to the carbon black treatment, so that the purifying gas executes a cycle.

9. A method of purifying carbon black containing carbide of iron group metal which has been formed on iron-containing contacts consisting in spraying or sprinkling the carbon black into a gas comprising at least one of the substances chlorine gas and hydrogen chloride gas, subjecting the suspended carbon black in this gas to temperatures exceeding 400° C., removing the metal halides formed in the gas, and resupplying the gas to the carbon black treatment, so that the purifying gas executes a cycle.

HANS HEINRICH FRANCK.
DIEDERICH WILM.